Oct. 16, 1956 W. E. BROWN 2,767,038
ENGINE PISTON
Filed Oct. 27, 1953 2 Sheets-Sheet 1

INVENTOR.
WILLIAM E. BROWN
BY
ATTORNEYS

Oct. 16, 1956     W. E. BROWN     2,767,038
ENGINE PISTON
Filed Oct. 27, 1953     2 Sheets-Sheet 2
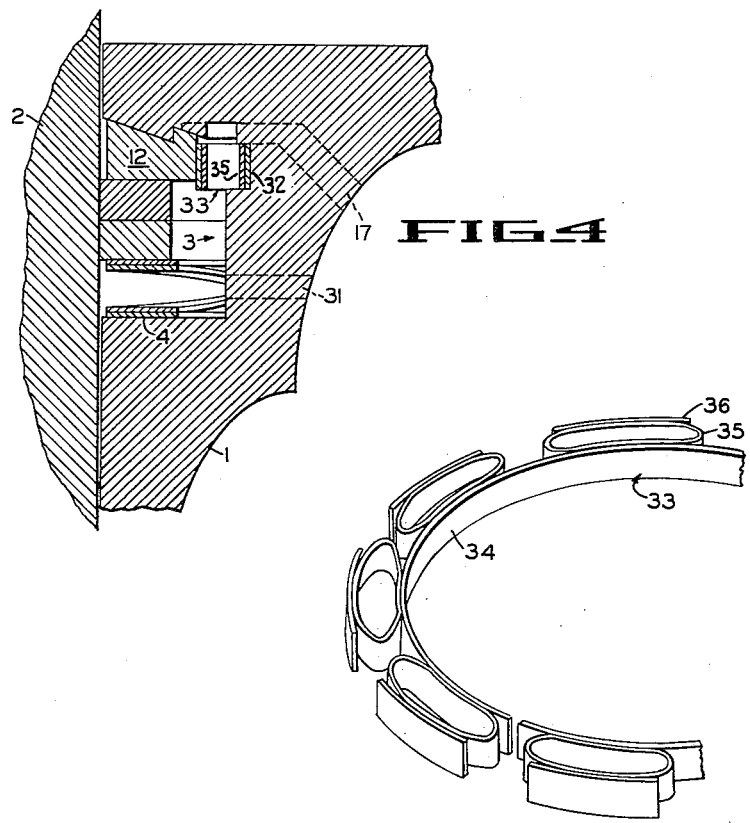
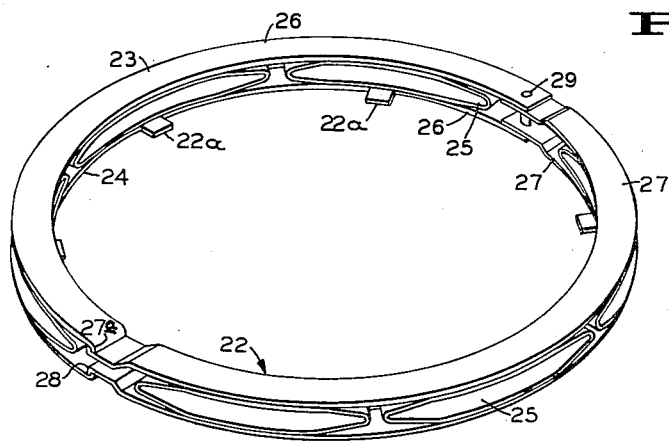
INVENTOR.
WILLIAM E. BROWN
BY
ATTORNEYS

United States Patent Office 2,767,038
Patented Oct. 16, 1956

2,767,038
ENGINE PISTON

William E. Brown, Sacramento, Calif.

Application October 27, 1953, Serial No. 388,617

5 Claims. (Cl. 309—32)

This invention relates to and in general has for its object the provision of a piston and piston ring assembly for internal combustion engines.

In assemblies of this general character now in use the hot products of combustion leak past the leading upper ring, char the oil surrounding the ring and force the ring outward against the cylinder walls. The charred oil sometimes causes the rings to stick and particles of the charred oil cause abrasion of the rings and the cylinder walls. It is a combination of these factors which results in the undue wear of the cylinder walls over the zone of travel thereover by the piston ring.

More specifically it is the object of this invention to provide what may be termed a servo piston and piston ring assembly wherein the pressure exerted by the products of combustion serve to lock the piston rings in proper sealing and sliding engagement with the cylinder walls and in sealing engagement with the piston walls.

In doing this, resort is had to a piston having an undercut inclined wall, a split ring having an inclined wall complementary to and in sealing engagement with the undercut inclined wall of the piston but positively spaced from the cylinder walls, a pair of conventional split rings disposed below the first split ring, these latter rings forming a seal between the cylinder walls and the first split ring, means for upwardly biasing these three rings and means for lubricating the entire assembly.

The invention possesses other advantageous features, some of which, with the foregoing, will be set forth at length in the following description where those forms of the invention which have been selected for illustration in the drawings accompanying and forming a part of the present specification, are outlined in full. In said drawings, two forms of the invention are shown, but it is to be understood that it is not limited to such forms, since the invention as set forth in the claims may be embodied in other forms.

Referring to the drawings:

Fig. 4 is a fragmentary vertical section similar to Fig. 1 but wherein the upper ring is backed by a radially expandable compression spring.

Fig. 5 is a fragmentary perspective view of the radially expandable compression spring associated with the assembly shown in Fig. 4.

Fig. 6 is a perspective view of the longitudinally compressible spring utilized in the assemblies shown in both Figs. 1 and 4.

Figure 1:
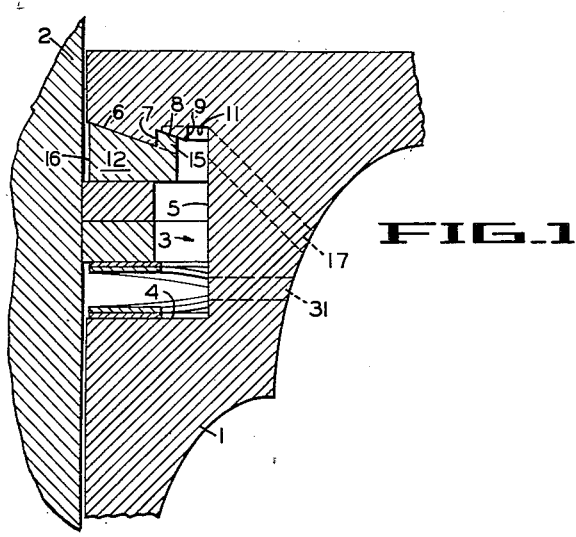
Fig. 1 is a fragmentary vertical mid-section taken through a cylinder piston and piston ring assembly embodying the objects of my invention.
Figure 2:
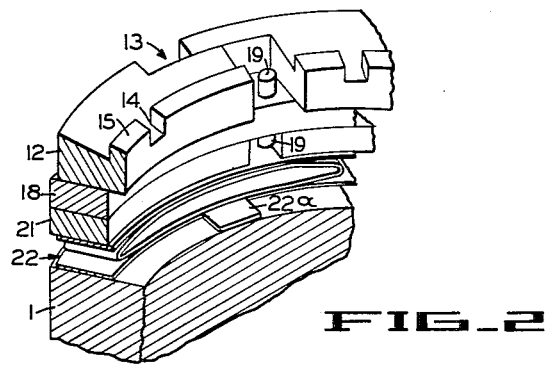
Fig. 2 is a fragmentary perspective view of the piston and ring assembly illustrated in Fig. 1.
Figure 3:
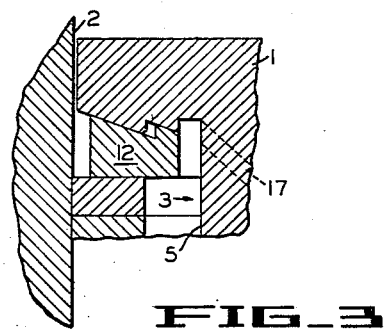
Fig. 3 is a vertical mid-section similar to Fig. 1 but showing the upper ring of the ring assembly in its contracted position.

As shown in Figs. 1, 2 and 3, the objects of my invention have been embodied in a piston 1 arranged to have a running fit within a cylinder 2. Formed intermediate the ends of the piston 1 is a channel generally designated by the reference numeral 3 and defined by a lower wall 4 normal to the axis of the cylinder 2, a cylindrical wall 5 parallel to said axis, a stepped upper wall including an inclined portion 6, a vertical shoulder 7, a second inclined portion 8, a second vertical shoulder 9 and a flat portion 11 normal to said axis.

Disposed within the channel 3 is a 3 unit ring assembly including an upper stepped split ring 12 having an inclined and stepped upper surface mating with the upper surface of the channel 3. As more clearly shown in Fig. 2, the ring 12 is provided with a butt lapped type joint generally indicated by the reference numeral 13 and with oil notches 14 formed in its shoulder 15. As shown in Fig. 1, the outer periphery 16 of the ring 12 has positive clearance with the cylinder 2, this clearance being assured by the interaction of the shoulder 7 of the piston 1 and the shoulder 15 of the ring 12. Extending through the piston 1 and communicating with each of the notches 14 is an oil passageway 17 terminating within the shoulder 7 as indicated in dash line in Figures 1, 3 and 4.

Contacting the lower face of the ring 12 is a split ring 18 having sealing engagement with the wall of the cylinder 2. This ring, like the ring 12, is provided with a butt lapped type joint and is provided with a number of peripherally spaced vertically disposed pins 19 extending above and below its surface. As shown in Fig. 2, the upper ends of the pins 19 are located between the adjacent ends of the upper ring 12 and serve to prevent the rotation thereof relative to the intermediate ring 18.

Located beneath the intermediate ring 18 and in contact therewith is a conventional split ring 21 in sealing engagement with the cylinder 2 and also having a butt lapped type joint. As shown in Fig. 2, the lower portions of the pins 19 are arranged to be accommodated within the confines of the butt lap joint. From this construction, it will be seen that there is little or no relative peripheral movement between the three rings 12, 18 and 21.

Disposed between the lower face of the ring 21 and the lower wall 4 of the channel 3 is a longitudinally compressible spring generally designated by the reference numeral 22 and provided with inwardly extending spacing lugs 22ª having engagement with the vertical wall 5 of the channel 3.

As shown in Fig. 6, the spring 22 includes upper and lower flat rings 23 and 24 held in vertically spaced relation with each other by vertically compressible elliptical spring members 25. The rings 23 and 24 are made up of semi-circular segments 26 and 27 joined at one end by shoulders 27ª and 28 and joined at its other ends by a pin 29. One end of the pin 29 is fixed to two of the overlapping segments 26 and 27 while its other end is free to move through bores formed in the other ends of the lower overlapping segments 26 and 27. As a result of this construction, it will be seen that the two rings 23 and 24 can be moved longitudinally towards each other against the biasing action of the elliptical springs 25 and that these rings are not capable of any radial expansion.

Communicating between the interior of the piston 1 and the lower portion of the channel 3 are a plurality of radially extending oil holes 31.

The spring 22 holds the upper ring in sealing engagement with the upper wall of the channel 3 and the intermediate and lower rings 18 and 21 in sealing engagement with the cylinder 2 and in sealing engagement with each other.

When the explosive charge above the piston 1 has been fired, the gases resulting therefrom, and which of course are under considerable pressure, immediately find their way between the walls of the piston and cylinder and between the outer cylindrical wall of the upper ring 12 and the cylinder. The upper ring 12 is thereby contracted radially to the position illustrated in Fig. 3. Due to the inclined contacting surfaces of the ring 12 and the upper wall of the channel 3, the inward radial movement or contraction of the ring 12 is of necessity accompanied by a corresponding downward movement thereof. The downward component of movement of the ring 12 further compresses the ring assembly between the spring 22 and the upper wall of the channel 3, thereby serving to restrain the rings 18 and 21 from moving radially. In other words, this structure serves to maintain the rings 18 and 21 in their normal running and sealing engagement with the walls of the cylinder 2. By maintaining the rings 18 and 21 in their normal sealing engagement and free running fit with the walls of the cylinder 2, the scoring of the cylinder walls is precluded. Furthermore, the running seal so effected between the ring assembly and the piston walls precludes the hot products of combustion from gaining access to the interior of the channel 3 and thereby the burning of any oil disposed within the confines of the channel 3 is precluded. This in turn results in avoiding the formation of carbon and the migration thereof to the cylinder walls.

In summary, this structure precludes the formation of carbon which would normally migrate to the cylinder walls and result in scoring them and precludes the intermediate and lower piston rings from being forced radially outward into scoring contact with the cylinder walls.

The modification shown in Fig. 4 is in all respects similar to that shown in Fig. 1 with the exception that channel 3 of the piston 1 is provided at its upper end with an additional inwardly extending recess 32. Accommodated partly in this recess is a radially compressible annular spring generally designated by the reference numeral 33, the outer portion of this spring being in contact with the inner wall of the upper split ring 12.

As shown in Fig. 5, the spring 33 includes a ring 34 provided on its outer face with a plurality of peripheral spaced helical spring members 35 faced with peripherally spaced circular segments 36. The action of the spring 33 is simply to urge the upper split ring 12 outwardly to partly compensate for the inward pressure exerted thereon by the products of combustion.

The strength of the spring 22 should be sufficient to preclude products of combustion from forcing the two rings 18 and 21 downwardly and of course will differ with engines of different design. Likewise the degree of inclination of the inclined walls of the channel 3 and the upper ring 12 depend upon the pressure developed by the products of combustion and the strength of the spring 22. These factors should be such that the ring 12 can be contracted to an appreciable extent under the influence of the pressure of the products of combustion. The same factors of course govern the strength of the radially compressible spring 33.

During the entire operation of this device, the channel 3 is always full of oil for it is in closed circuit with the interior of the piston through the oil holes 31 and the oil passageway 17. Upon the explosion of a charge of fuel above the piston, the ring 12 contracts from its position as shown in Figures 1 and 4 to its position as shown in Figure 3, and during this movement, oil from the upper terminal end of the passageway 17 enters the small annular channel formed between the shoulder 7 of the piston 1 and the shoulder 15 of the ring 12. Upon the subsequent expansion of the ring 12, the oil within this annular channel serves to cushion the outward terminal movement of the ring, for the oil contained within the annular channel can escape therefrom only through the relatively small and few upper terminal ends of the oil passageway 17. It will therefore be seen that this construction serves as a dash-pot for preventing sharp impacts between the shoulder 15 of the ring 12 and the shoulder 7 of the piston 1 and thus avoiding undue wear between these parts. This dash-pot action is particularly desirable in conjunction with all but the smallest of pistons and when, as illustrated in Fig. 4, the ring 12 is biased by the spring 33.

The spring 33 is resorted to for securing the proper initial tension in the ring assembly, for providing a reserve tension to compensate for wear and for restricting the operating movement of the sealing ring.

Having thus described my invention, what I claim and desire to secure by Letters Patent is:

1. A device of the character described comprising: a piston slidably disposed in a cylinder and having positive clearance therewith, said piston being formed intermediate its ends with an annular piston ring receiving channel, the upper wall of said channel being outwardly inclined, and said piston being formed with a pair of oil holes for establishing communication at axially spaced points between said channel and the hollow interior of said piston; a first resilient split ring disposed in said channel, said ring having an upper inclined face complementary to the upper wall of said channel, the inner and outer peripheral side walls of said ring having positive clearance with said cylinder and with the side walls of said channel; a second resilient split ring disposed in said channel beneath said first split ring in sealing engagement therewith and with the walls of said cylinder; and spring means disposed in said channel for compressing said rings against each other and for compressing said first split ring against the upper inclined wall of said channel.

2. A device such as defined in claim 1, wherein one of said oil holes forms a continuation of the upper inclined wall of said channel and the other of said holes is located substantially opposite said spring means.

3. A device of the character described comprising: a piston slidably disposed in a cylinder and having positive clearance therewith, said piston being formed intermediate its ends with an annular piston ring receiving channel, the upper wall of said channel being outwardly inclined; a first resilient split ring disposed in said channel, said ring having an upper inclined face complementary to the upper wall of said channel, the inner an outer peripheral side walls of said ring having positive clearance with said cylinder and with the side walls of said channel; a second resilient split ring disposed in said channel beneath said first split ring in sealing engagement therewith and with the walls of said cylinder; spring means disposed in said channel for compressing said rings against each other and for compressing said first split ring against the upper inclined wall of said channel; and means for dampening the expansion movement of said first resilient ring.

4. A device of the character described comprising: a piston slidably disposed in a cylinder and having positive clearance therewith, said piston being formed intermediate its ends with an annular piston ring receiving channel, the upper wall of said channel being outwardly inclined; a first resilient split ring disposed in said channel, said ring having an upper inclined face complementary to the upper wall of said channel, the inner and outer peripheral side walls of said ring having positive clearance with said cylinder and with the side walls of said channel; a second resilient split ring disposed in said channel beneath said first split ring in sealing engagement therewith and with the walls of said cylinder; and spring means disposed in said channel for compressing said rings against each other and for compressing said first split ring against the upper inclined wall of said channel, said first split ring being provided adjacent its upper inner edge with an upstanding annular shoulder, and said piston being provided with an annular recess for the reception of said shoulder and with an oil passageway extending from the interior of said piston to said annular recess.

5. A device of the character described comprising: a piston slidably disposed in a cylinder and having positive clearance therewith, said piston being formed intermediate its ends with an annular piston ring receiving channel, the upper wall of said channel being outwardly inclined; a first resilient split ring disposed in said channel, said ring having an upper inclined face complementary to the upper wall of said channel, the inner and outer peripheral side walls of said ring having positive clearance with said cylinder and with the side walls of said channel; a second resilient split ring disposed in said channel beneath said first split ring in sealing engagement therewith and with the walls of said cylinder; spring means disposed in said channel for compressing said rings against each other and for compressing said first split ring against the upper inclined wall of said channel; and a radially contractible spring recessed in said piston in operative engagement with said first resilient split ring for outwardly biasing said ring.

References Cited in the file of this patent

UNITED STATES PATENTS

| | | |
|---|---|---|
| 1,591,835 | Johnston | July 6, 1926 |
| 1,747,568 | Blomgren | Feb. 18, 1930 |